US007055503B2

(12) United States Patent
Shibagaki

(10) Patent No.: US 7,055,503 B2
(45) Date of Patent: Jun. 6, 2006

(54) FUEL INJECTION CONTROLLER FOR ENGINE

(75) Inventor: Nobuyuki Shibagaki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 11/052,191

(22) Filed: Feb. 8, 2005

(65) Prior Publication Data

US 2005/0178356 A1 Aug. 18, 2005

(30) Foreign Application Priority Data

Feb. 12, 2004 (JP) ............................ 2004-035492

(51) Int. Cl.
*F02B 7/00* (2006.01)
*F02D 41/22* (2006.01)
*B60T 7/12* (2006.01)

(52) U.S. Cl. ...................................... 123/431; 123/436

(58) Field of Classification Search ................ 123/299, 123/300, 491, 435, 436, 431, 492, 493, 304, 123/339.14; 701/103–105, 110, 113
See application file for complete search history.

(56) References Cited

U.S. PATENT DOCUMENTS 5,950,594 A * 9/1999 Mizuno ...................... 123/295
6,334,835 B1 * 1/2002 Tanaka et al. .............. 477/205
6,352,491 B1 * 3/2002 Mashiki et al. ............. 477/107
6,684,852 B1 * 2/2004 Wright et al. ............... 123/431
6,755,176 B1 * 6/2004 Takeuchi et al. ............ 123/299
6,766,790 B1 * 7/2004 Grass et al. ................ 123/491
6,786,201 B1 * 9/2004 Ohtani ....................... 123/431
6,915,784 B1 * 7/2005 Tomoda et al. ............. 123/431
6,928,983 B1 * 8/2005 Mashiki ...................... 123/431

FOREIGN PATENT DOCUMENTS

| | | | |
|---|---|---|---|
| JP | A 10-131784 | | 5/1998 |
| JP | A 10-252512 | | 9/1998 |
| JP | A 2000-008907 | | 1/2000 |
| JP | A 2002-364409 | | 12/2002 |
| JP | 2005-226530 | * | 8/2005 |

* cited by examiner

*Primary Examiner*—Hai Huynh
(74) *Attorney, Agent, or Firm*—Oliff & Berridge, PLC

(57) ABSTRACT

A fuel injection controller for an engine having a direct injector for injecting fuel into a cylinder and an intake injector for injecting fuel into an intake passage. When the engine is idling, the controller reduces a target engine speed while preventing the engine from stalling. The fuel injection controller supplies fuel to the engine through the direct injector and the intake injector when the engine is idling. The electronic control unit determines if there is a possibility of the engine stalling when the engine is idling. When having determined that there is such a possibility, the electronic control unit selectively increases the fuel injection amount of the direct injector.

9 Claims, 6 Drawing Sheets

FUEL INJECTION CONTROLLER FOR ENGINE

BACKGROUND OF THE INVENTION

The present invention relates to a fuel injection controller for use in an engine, having a direct injector for injecting fuel into a cylinder and an intake injector for injecting fuel into an intake passage, to control the drive mode of the injectors based on the operation condition of the engine.

Such an engine is supplied with fuel in one of the next injection modes.

(a) Fuel is supplied to the engine by only the direct injector (in-cylinder injector).

(b) Fuel is supplied to the engine by only the intake injector.

(c) Fuel is supplied to the engine by both the direct injector and the intake injector.

The supply of fuel to the engine by both the direct injector and the intake injector when the engine is idling reduces the amount of fuel that is injected by the intake injector and deposited on the walls of the intake passage. This enables the target speed (the target engine speed during idling) to be lowered so that the fuel efficiency can be improved.

However, when the target speed is set to a lower value, the engine is prone to stall. Therefore, measures should be taken to avoid such a problem.

Japanese Laid-Open Patent Publication No. 2002-364409 describes an example of a fuel injection controller for an engine in the prior art. The controller described in the publication drives a direct injector in addition to an intake injector when performing homogeneous combustion. In this controller, however, the engine may stall if the target speed is reduced. Therefore, it is difficult to lower the target speed with this controller.

SUMMARY OF THE INVENTION

For an engine having a direct injector and an intake injector, it is an object of the present invention to provide a fuel injection controller which is capable of lowering the target speed while preventing the engine from stalling when the engine is idling.

One aspect of the present invention is a controller for an engine having a direct injector for injecting fuel into a cylinder and an intake injector for injecting fuel into an intake passage. The controller supplies the engine with fuel through the direct injector and the intake injector when the engine is idling. The controller includes a control unit which determines whether there is a possibility of the engine stalling when the engine is idling and increases fuel injection amount of the direct injector when determining that there is a possibility of the engine stalling.

A further aspect of the present invention is a controller for an engine having a direct injector for injecting fuel into a cylinder and an intake injector for injecting fuel into an intake passage. When the engine is idling, the controller sets a direct injection amount, indicating fuel injection amount of the direct injector, and an intake injection amount, indicating fuel injection amount of the intake injector, and accordingly injects fuel from the direct injector and the intake injector. The controller includes a control unit for determining whether there is a possibility of the engine stalling when the engine is idling. When determining that there is a possibility of the engine stalling, the control unit calculates an increment value for the direct injection amount and adds the increment value to the direct injection amount to set the fuel injection amount of the direct injector.

Another aspect of the present invention is a method for controlling an engine having a direct injector, for injecting fuel into a cylinder, and an intake injector, for injecting fuel into an intake passage. The method includes supplying the engine with fuel through the direct injector and the intake injector when the engine is idling, determining whether the engine speed is lower than a first threshold value when the engine is idling, determining whether variation of the engine speed is no less than a second threshold value when the engine is idling, and increasing fuel injection amount of the direct injector when the engine speed is lower than the first threshold value and the variation of the engine speed is no less than the second threshold value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A fuel injection controller according to a preferred embodiment of the present invention will now be described with reference to FIGS. 1 through 8.

Figure 1:
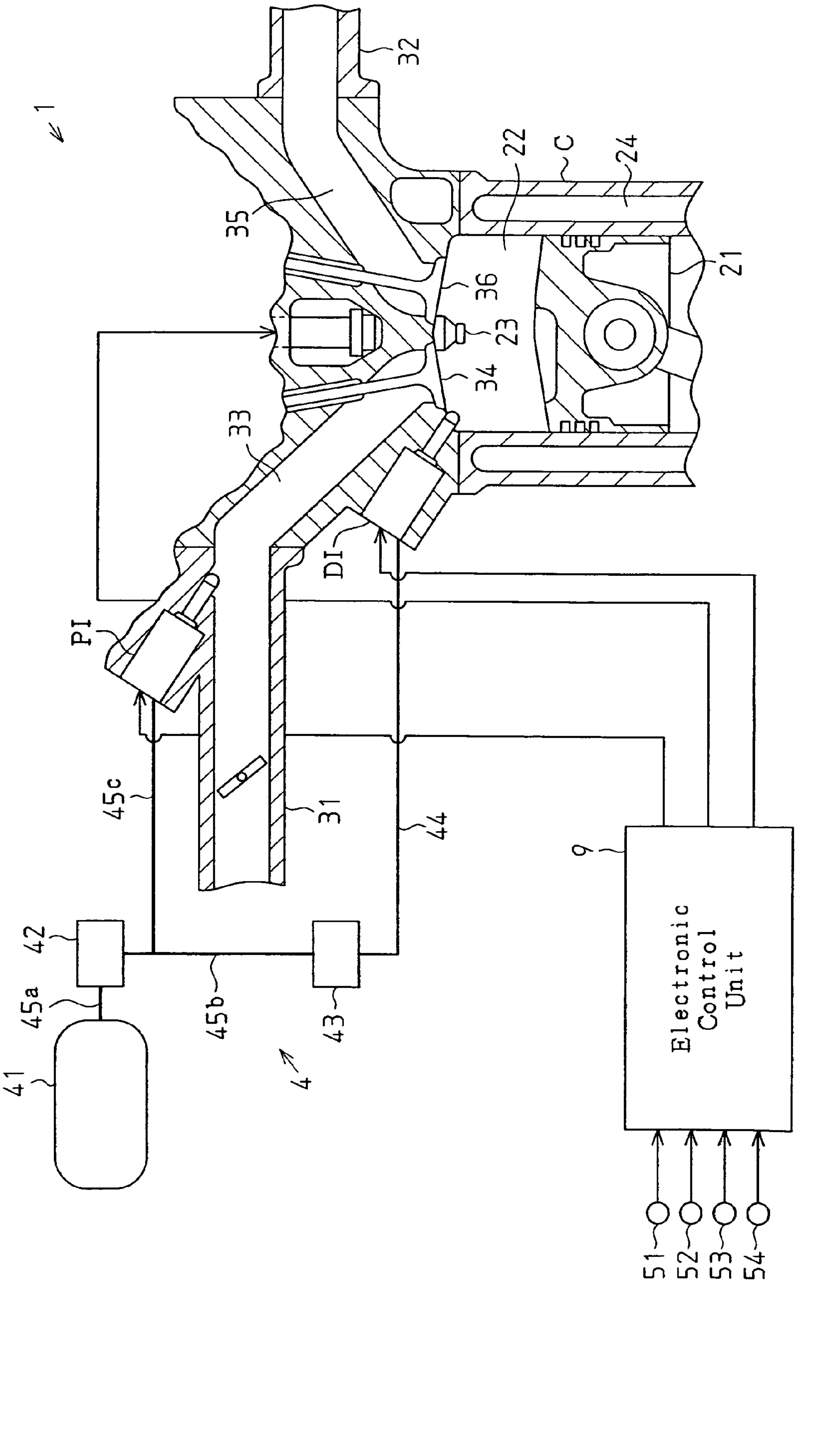
FIG. 1 is a schematic diagram showing a fuel injection controller according to a preferred embodiment of the present invention.

FIG. 1 schematically shows the structure of engine fuel and control systems in addition to the peripheral structure of an engine cylinder.

An engine 1 includes cylinders C. A direct injector DI is provided for each cylinder C for directly injecting fuel into the cylinder C. A piston 21 reciprocates in the cylinder C. A combustion chamber 22 is defined in the cylinder C between the top face of the piston 21 and the walls of the cylinder C.

The cylinder C is connected to an intake passage 31 and an exhaust passage 32. The intake passage 31 is provided with a port injector (intake injector) PI, which injects fuel into an intake port 33 of the cylinder C. The intake passage 31 is connected to the combustion chamber 22 via the intake port 33. An intake valve 34 is arranged in the intake port 33 to open and close the intake port 33 and alter the connection state between the intake passage 31 and the combustion chamber 22.

The port injector PI is arranged in the intake port 33 upstream from the intake valve 34 (in the side closer to the intake passage 31). The exhaust passage 32 is connected to the combustion chamber 22 via an exhaust port 35. An exhaust valve 36 is arranged in the exhaust port 35 to open and close the exhaust port 35 and alter the connection state between the exhaust passage 32 and the combustion chamber 22. An ignition plug 23 is arranged at the top of the combustion chamber 22 to ignite a mixture of fuel and air.

A direct injector DI is provided in the cylinder C such that its injection orifice is exposed to the combustion chamber 22. A water jacket 24 is formed around the cylinder C.

A fuel system 4 supplies fuel to the direct injector DI and to the port injector PI. The fuel system 4 includes a fuel tank 41, a feed pump 42, a high-pressure fuel pump 43, and a high-pressure fuel line 44. The fuel tank 41 is connected to the feed pump 42 by a first fuel line 45*a*. The feed pump 42 is connected to the high-pressure fuel pump 43 by a second fuel line 45*b*.

The port injector PI is connected to the second fuel line 45*b* by a third fuel line 45*c*. The direct injector DI is connected to the high-pressure fuel pump 43 by the high-pressure fuel line 44. The feed pump 42 draws in fuel from the fuel tank 41 and pumps the fuel to the port injector PI and the high-pressure fuel pump 43. The high-pressure fuel pump 43 further pressurizes the fuel from the feed pump 42. The pressure of the fuel pressurized by the high-pressure fuel pump 43 is accumulated by the high-pressure fuel line 44. The fuel in the high-pressure fuel line 44 is supplied to the direct injector DI.

The engine 1 is controlled in a centralized manner by an electronic control unit 9. The electronic control unit 9 controls the direct injector DI and the port injector PI based on the operation condition of the engine 1. The electronic control unit 9 has a CPU for performing calculations related to engine control, a memory for storing programs and information required for engine control, an input port for receiving a signal from an external device, and an output port for outputting a signal to an external device.

The input port of the electronic control unit 9 is connected to various sensors, which will be described below, for detecting the engine operation conditions.

A rotation speed sensor 51 detects the rotation speed of the crankshaft of the engine 1 (engine speed Ne).

A coolant temperature sensor 52 detects the coolant temperature of the engine 1 (coolant temperature THw).

An accelerator sensor 53 detects the depressed amount of the accelerator in the vehicle on which the engine 1 is mounted (accelerator depression amount Accp).

A vehicle velocity sensor 54 detects the traveling velocity of the vehicle on which the engine 1 is mounted (vehicle velocity Sp).

The output port of the electronic control unit 9 is connected to the direct injector DI, the port injector PI, the ignition plug 23, etc.

Features of Direct Injection and Port Injection

The engine output and fuel efficiency are improved when fuel is injected from the direct injector DI (direct injection). However, air and fuel are mixed only in the cylinder during direct injection. Therefore, under circumstances in which vaporization of fuel is difficult, air and fuel may not sufficiently mix. This may deteriorate combustion conditions.

In contrast, when fuel is injected by the port injector PI (port injection), the fuel is injected into the intake port. Therefore, the injected fuel is more easily vaporized during port injection than during direct injection. This produces a satisfactory air-fuel mixture. Accordingly, in this embodiment, when the engine 1 is cold (when the coolant temperature is lower than a threshold temperature) and it is difficult for fuel to vaporize, the electronic control unit 9 performs fuel injection only with the port injector PI.

Conversely, when the engine 1 is warm (when the temperature of coolant for the engine 1 is higher than the threshold temperature) and being operated at a high engine speed or under a high load, the electronic control unit 9 performs fuel injection with only the direct injector DI. When the engine 1 is warm and being operated at a low engine speed under a low load, such as when the engine 1 is idling, the electronic control unit 9 performs fuel injection with both the direct injector DI and the port injector PI. This reduces the amount of fuel that is injected by the port injector PI and deposited on the walls. Thus, taking into consideration the reduced amount of fuel deposited on the walls, the electronic control unit 9 sets the target speed Net (target value of engine speed Ne during idling) to a value lower than when fuel is injected only from the port injector PI.

Figure 2:
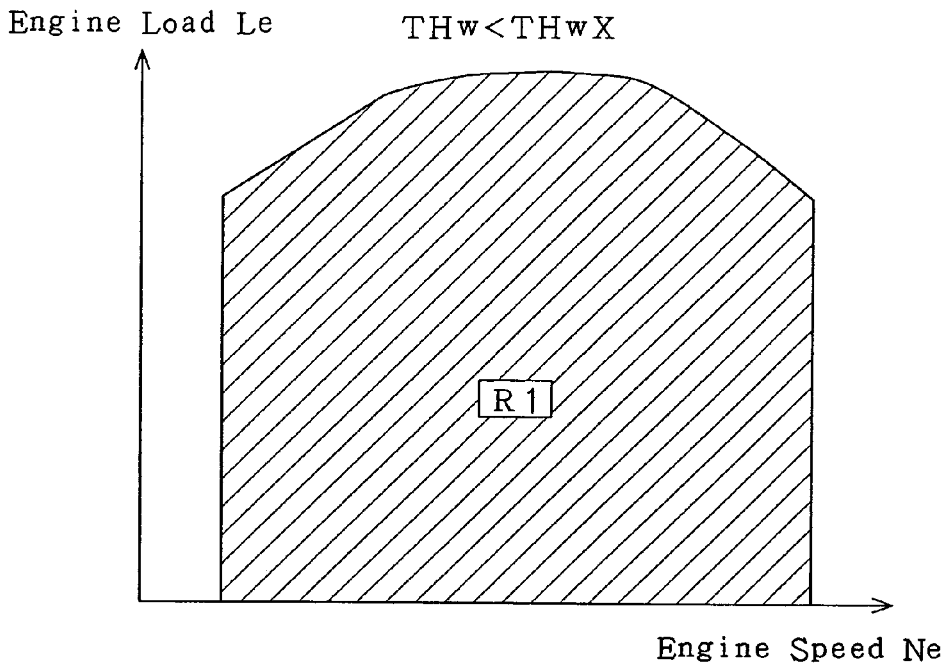
FIG. 2 is a map indicating the relationship between engine operating ranges and the injectors that are used in the preferred embodiment of the present invention.
Figure 3:
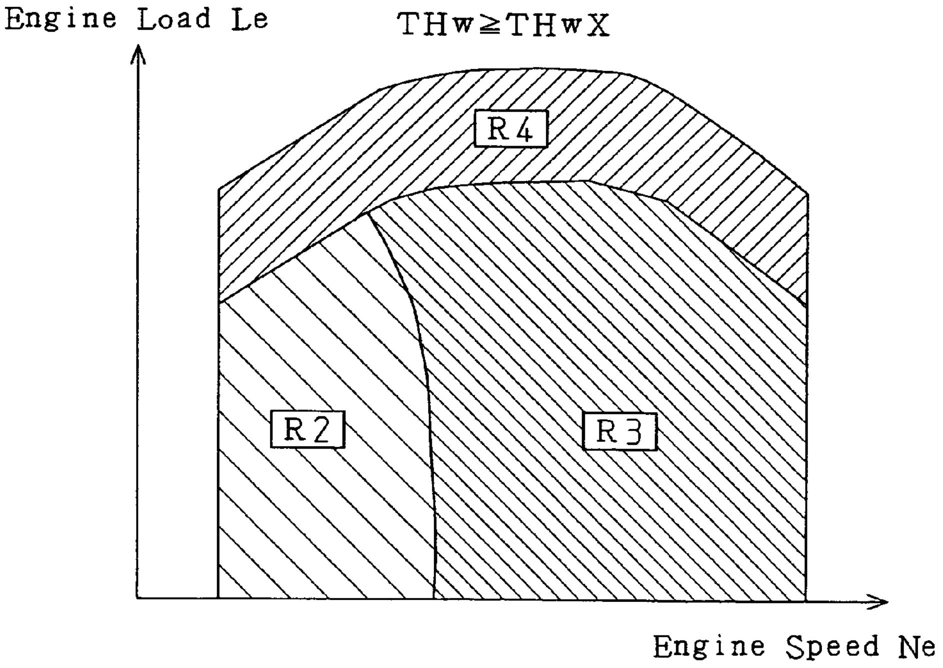
FIG. 3 is a map indicating the relationship between engine operating ranges and the injectors that are used in the preferred embodiment of the present invention.

Specifically, the electronic control unit 9 selects the injector DI and the injector PI that are to be used based on the maps shown in FIGS. 2 and 3.

FIG. 2 shows a map used when the engine 1 is cold. FIG. 3 shows a map used when the engine 1 is warm. In these maps, the injectors that are to be used in the respective operating ranges of the engine 1 are set as described below.

first range R1: port injector PI second range R2: port injector PI and direct injector DI third range R3: direct injector DI fourth range R4: direct injector DI Engine stalling is prone to occur when the target speed Net is lowered. Therefore, measures must be taken to prevent engine stalling.

Accordingly, in this embodiment, the electronic control unit 9 controls the injectors DI and PI by performing fuel injection processing and direct injection amount correction processing, which will be described below.

Fuel Injection Processing

The fuel injection processing will be described with reference to FIG. 4. Hereafter, a command value of the fuel injection amount set for the direct injector DI by the electronic control unit 9 will be referred to as "direct injection amount FiD", and a command value of the fuel injection amount set for the port injector PI by the electronic control unit 9 will be referred to as "port injection amount FiP".

The electronic control unit 9 cyclically performs fuel injection processing during operation of the engine 1 at predetermined crank angle interrupts.

In step S100, the electronic control unit 9 calculates, or determines, the required fuel injection amount value (re quired injection amount reqFi) through following processes (a) and (b).

(a) The electronic control unit 9 calculates the load on the engine 1 (engine load Le) based on the engine speed Ne and the accelerator depression amount Accp. The engine load Le indicates the ratio of the current load relative to the maximum engine load. For example, the electronic control unit 9 determines the engine load Le from a predetermined map.

(b) The electronic control unit 9 calculates the required injection amount reqFi based on the engine load Le. For example, the electronic control unit 9 determined the required injection amount reqFi from a predetermined map.

In step S200, the electronic control unit 9 determines whether or not the coolant temperature THw is no lower than the threshold temperature THwX. That is, the electronic control unit 9 determines whether or not the following condition of THw≧THwX is satisfied. The threshold temperature THwX is predetermined as a value for determining that the engine 1 is warmed and not in a cold state (including a state in which the engine 1 has already been warmed).

When the engine 1 is cold, in step S300, the electronic control unit 9 applies the engine speed Ne and the engine load Le to the map shown in FIG. 2 to select the injector that is to be used for fuel injection. The coolant temperature THw is lower than the threshold temperature THwX. Thus, the electronic control unit 9 selects a first injection mode, in which the required injection amount reqFi of fuel is supplied to the engine 1 by the port injector PI, irrespective of the operation condition of the engine 1. In the first injection mode, the required injection amount reqFi is expressed by the next equation.

$$reqFi=FiP$$

When the engine 1 is warm and not in a cold state, in step D400, the electronic control unit 9 applies the engine speed Ne and engine load Le to the map shown in FIG. 3 to select the injector that is to be used for fuel injection.

(a) When the engine 1 is operating in a low speed, low load state (including when the engine is idling), the electronic control unit 9 selects a second injection mode, in which the required injection amount reqFi of fuel is supplied to the engine 1 by both the direct injector DI and the port injector PI. In the second injection mode, the required injection amount reqFi is expressed by the next equation.

$$reqFi=FiD+FiP$$

The electronic control unit 9 sets the ratio between the direct injection amount FiD and the port injection amount FiP based on the engine speed Ne and the engine load Le.

(b) When the engine 1 is operating in a high speed or high load state, the electronic control unit 9 selects a third injection mode, in which the required injection amount reqFi of fuel is supplied to the engine 1 by the direct injector DI. In the third injection mode, the required injection amount reqFi is expressed by the next equation.

$$reqFi=FiD$$

In step S500, the electronic control unit 9 determines whether or not the engine 1 is idling. For example, if both of the following conditions (a) and (b) are satisfied, the electronic control unit 9 determines that the engine 1 is idling.

(a) The accelerator depression amount Accp is zero (accelerator pedal is not depressed at all).

(b) The vehicle is not traveling or traveling at a velocity Sp in which the vehicle is close to stopping.

During idle operation, the electronic control unit 9 also executes idling speed control for converging the engine speed Ne to the target speed Net.

In step S600, when the engine 1 is idling, the electronic control unit 9 performs direct injection amount correction processing (see FIG. 5) to correct the direct injection amount FiD in order to avoid the engine stalling. The direct injection amount correction processing will be later described in detail.

In step S700, the electronic control unit 9 sets, or determines, the fuel injection initiation timings of the direct injector DI and the port injector PI based on the engine speed Ne and the engine load Le.

In step S800, the electronic control unit 9 calculates, or determines, the fuel injection period (crank angle) required for injecting the amount of fuel set for the direct injector DI and the port injector PI based on the engine speed Ne and the fuel injection amount set for each of the injectors DI and PI.

In step S900, the electronic control unit 9 generates a fuel injection signal for each cylinder based on the fuel injection initiation timing and the fuel injection period obtained through the above processing. Then, the electronic control unit 9 provides the generated signal to the injectors DI and PI of each cylinder. The fuel injection signal remains ON from the designated fuel injection initiation timing to when the designated fuel injection period elapses.

The fuel injection processing will now be summarized.

(a) When the coolant temperature THw is lower than the threshold temperature THwX, the electronic control unit 9 uses the port injector PI to perform fuel injection.

(b) When the coolant temperature THw is not lower than the threshold temperature THwX and the engine 1 is idling, the electronic control unit 9 uses both the direct injector DI and the port injector PI to perform fuel injection.

(c) When the coolant temperature THw is not lower than the threshold temperature THwX and the engine 1 is operating at a high speed or under a high load, the electronic control unit 9 uses the direct injector DI to perform fuel injection.

Direct Injection Amount Correction Processing

The direct injection amount correction processing will now be described with reference to FIGS. 5 and 6.

In step S601, the electronic control unit 9 determines whether or not the engine speed Ne is lower than the threshold speed NeX. That is, the electronic control unit 9 determines whether or not the condition of Ne<NeX is satisfied. The threshold speed NeX is predetermined through tests or the like as a value for determining the possibility of the engine 1 stalling.

In step S602, the electronic control unit 9 determines whether or not the variation in engine speed Ne (speed variation ΔNe) is no less than the threshold variation ΔNeX. That is, the electronic control unit 9 determines whether the condition of ΔNe≧ΔNeX is satisfied. The speed variation ΔNe represents a variation of the engine speed Ne in the negative direction. The threshold variation ΔNeX is predetermined through tests or the like and is a value for determining the possibility of the engine 1 stalling.

In step S603, when it is determined that the possibility of the engine 1 stalling is high based on the comparison of the engine speed Ne and speed variation ΔNe with the associated threshold values, the electronic control unit 9 then determines whether or not the direct injection amount FiD has been corrected with a direct injection correction amount FiDad (increment value). That is, the electronic control unit 9 determines whether or not the condition of FiDad>0 is satisfied. The direct injection correction amount FiDad represents a value that is added to the direct injection amount FiD to avoid engine stalling and is calculated through processing that will be described later.

In step S604, if the direct injection amount FiD has not been corrected with the direct injection correction amount FiDad, the electronic control unit 9 then sets the direct injection correction amount FiDad as the correction amount for the direct injection amount FiD. That is, the electronic control unit 9 sets the direct injection correction amount FiDad as an initial correction amount $\alpha$ by performing the following processing.

$$FiDad \leftarrow \alpha$$

In this embodiment, the initial correction amount $\alpha$ is predetermined through tests or the like at a value at which engine stalling can be avoided.

Figure 7:
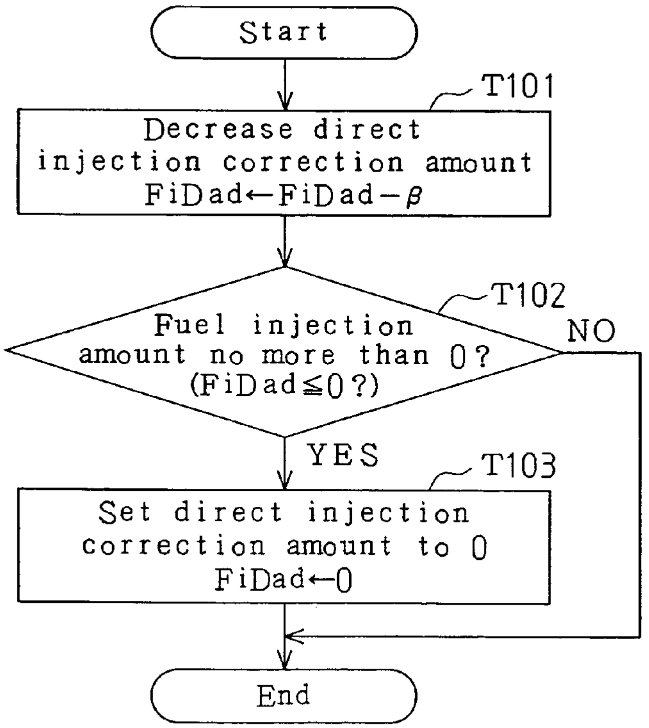
FIG. 7 is a flowchart showing the procedures of performed during correction amount gradation processing in the preferred embodiment of the present invention.

In step S605, when the direct injection amount FiD has been corrected with the direct injection correction amount FiDad, the electronic control unit 9 reads a direct injection correction amount FiDad calculated through correction amount gradation processing (see FIG. 7). That is, the electronic control unit 9 updates the direct injection correction amount FiDad by performing the following processing.

$$FiDad \leftarrow FiDad_{n-1}$$

The direct injection correction amount $FiDad_{n-1}$ corresponds to the value used in the previous cycle of this processing.

In step S606, the electronic control unit 9 corrects the direct injection amount FiD based on the direct injection amount FiD set by the processing in step 400 and the direct injection correction amount FiDad. That is, the electronic control unit 9 calculates a final fuel injection amount for the direct injector DI (direct injection amount FiD) by performing the following processing.

$$FiD \leftarrow FiD + FiDad$$

Then, an amount of fuel expressed by the following formula is supplied to the engine 1 by the direct injector DI and port injector PI.

$$reqFi + FiDad$$

In step S607, when it is determined that the possibility of the engine 1 stalling is low based on the comparison of the engine speed Ne and the speed variation $\Delta Ne$ with the associated threshold values, the electronic control unit 9 determines whether or not the direct injection amount FiD has been corrected with the direct injection correction amount FiDad. That is, the electronic control unit 9 determines whether or not the condition of $FiDad > 0$ is satisfied.

In step S608, when the direct injection amount FiD has been corrected with the direct injection correction amount FiDad, the electronic control unit 9 reads a direct injection correction amount FiDad that calculated through the correction amount gradation processing (see FIG. 7). That is, the electronic control unit 9 updates the direct injection correction amount FiDad by performing the following processing.

$$FiDad \leftarrow FiDad_{n-1}$$

The direct injection correction amount $FiDad_{n-1}$ corresponds to the value used in the previous cycle of this processing.

Correction Amount Gradation Processing

The correction amount gradation processing will now be described with reference to FIG. 7.

The electronic control unit 9 performs the correction amount gradation processing in the following manner.

Figure 6:
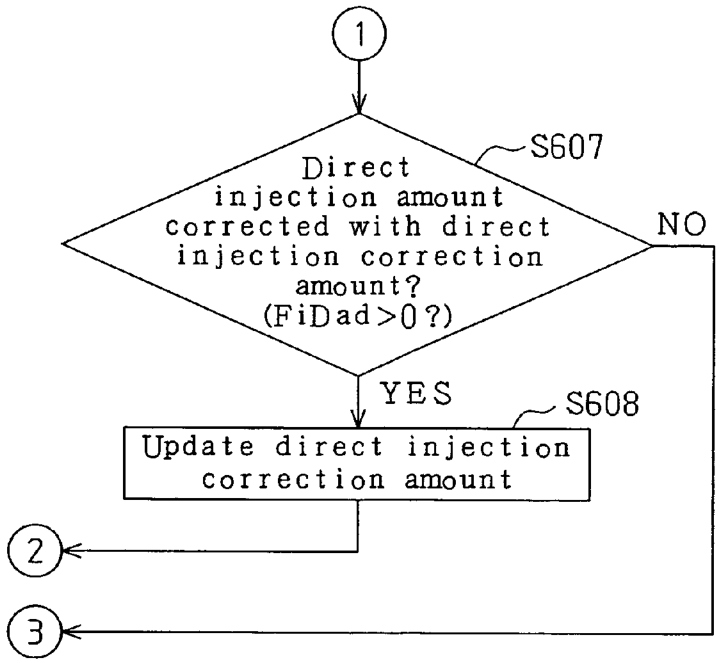
FIG. 6 is a flowchart showing part of the procedures performed during direct injection amount correction processing in the preferred embodiment of the present invention.

(a) The electronic control unit 9 starts the correction amount gradation processing when the initial correction amount $\alpha$ is set as the direct injection correction amount FiDad in the direct injection amount correction processing (FIG. 6).

(b) The electronic control unit 9 temporarily terminates the correction amount gradation processing when the direct injection correction amount FiDad has been gradually changed to zero.

(c) The electronic control unit 9 performs the correction amount gradation processing periodically at fixed interrupts whenever a predetermined time elapses.

The correction amount gradation processing will now be described in more detail.

In step T101, the electronic control unit 9 decreases the direct injection correction amount FiDad. Specifically, the electronic control unit 9 changes the direct injection correction amount FiDad to a value that is smaller than the previous cycle value by a gradation amount $\beta$ by performing the following processing.

$$FiDad \leftarrow FiDad - \beta$$

In step T102, the electronic control unit 9 determines whether or not the direct injection correction amount FiDad is no more than zero. That is, the electronic control unit 9 determines whether $FiDad \leqq 0$ is satisfied.

In step T103, if the direct injection correction amount FiDad is no more than zero, the electronic control unit 9 sets the direct injection correction amount FiDad to zero. That is, the electronic control unit 9 performs the following processing.

$$FiDad \leftarrow 0$$

Thus, the direct injection correction amount FiDad is gradually changed from the initial correction amount $\alpha$ to zero. This embodiment employs, as the gradation amount $\beta$, a value that is predetermined through tests or the like such that the direct injection correction amount FiDad can be decreased to zero without causing torque variation of the engine 1.

The direct injection amount correction processing and the correction amount gradation processing will now be summarized.

(a) If the possibility of engine stalling is high when the engine is idling, the electronic control unit 9 sets, as the direct injection amount FiD, a value obtained by adding the direct injection correction amount FiDad to the direct injection amount FiD that is set within the range of the required injection amount reqFi.

(b) After starting the correction of the direct injection amount FiD with the direct injection correction amount FiDad, the electronic control unit 9 gradually changes the direct injection correction amount FiDad to zero regardless of whether the possibility of engine stall is high or low.

The operation of this embodiment will now be described.

If the possibility of engine stalling is high when the engine 1 is idling, the electronic control unit 9 increases the amount of fuel injected by the direct injector DI (by the amount corresponding to the direct injection correction amount FiDad) into the engine 1. This increases the engine speed Ne and effectively prevents engine stalling.

The fuel injection amount of the direct injector DI is corrected to be increased. Thus, the correction is reflected as an increase in engine speed Ne with a quick response. Accordingly, engine stalling is prevented even in an engine for which the target speed Net for idling is set at a low value. Consequently, the electronic control unit 9 of this embodiment enables the target speed Net for idling to be set at a lower value. This improves fuel efficiency of engine 1.

To prevent engine stalling, for example, asynchronous injection of fuel from a port injector to increase the amount of fuel supplied to the engine is known in the art. However, the response of the engine speed Ne to an increase in the supplied fuel (period of time required for the increase of supplied fuel to be reflected as increase of the engine speed Ne) is inferior to that of the present embodiment. Therefore, it is difficult to set the target speed Net to a lower value than that of the present embodiment.

EXAMPLE OF CONTROL MODES

Figure 8:
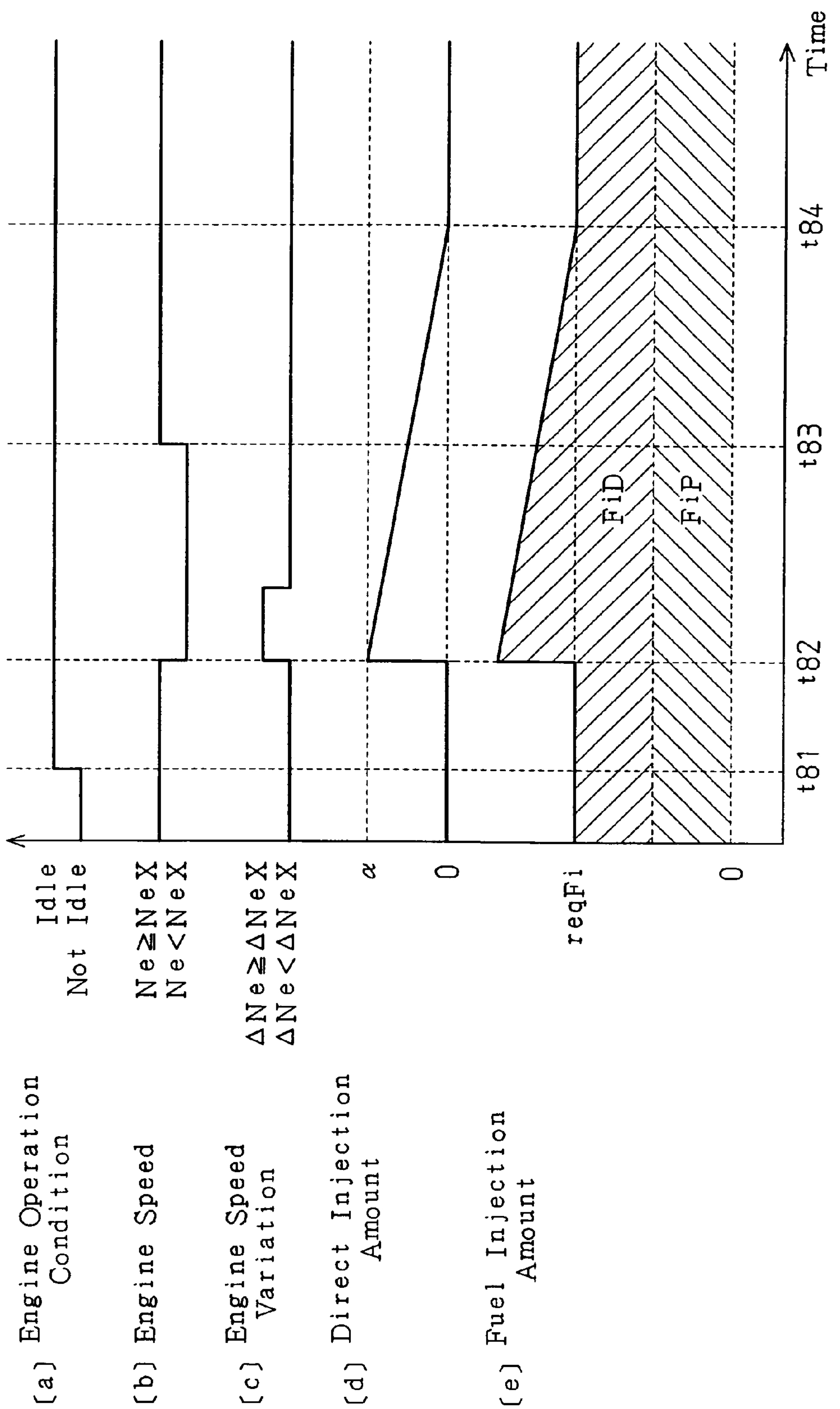
FIG. 8 is a time chart showing an example of control modes for the injectors during direct injection amount correction processing and correction amount gradation processing in the preferred embodiment of the present invention.

Referring to FIG. 8, an example of control modes when the direct injection amount correction processing and the correction amount gradation processing are performed will now be described.

In FIG. 8, times t81 to t84 respectively represent the following timings.

(i) Time t81 represents the timing when the engine 1 starts to idle.

(ii) Time t82 represents the timing when it is determined that the possibility of engine stalling is high.

(iii) Time t83 represents the timing when the relationship of $Ne \geqq NeX$ is satisfied.

(iv) Time t84 represents the timing when FiDad becomes zero.

In this processing, fuel injection is performed in the following modes.

In the period from time t81 to time t82, the required injection amount reqFi of fuel is supplied to the engine 1 by the direct injector DI and the port injector PI.

At time t82, an initial correction amount $\alpha$ is set as the direct injection correction amount FiDad. Then, the direct injection correction amount FiDad is added to the direct injection amount FiD, which is set within the range of the required injection amount reqFi. This sets the final fuel injection amount for the direct injector DI.

In the period from time t82 to time t84, the amount of fuel obtained by adding the direct injection correction amount FiDad to the required injection amount reqFi is supplied to the engine 1 by the direct injector DI and the port injector PI. Further, the direct injection correction amount FiDad is changed gradually from the initial correction amount $\alpha$ to zero. The increasing correction keeps the engine speed Ne higher than the threshold speed NeX (time t83).

From time t84, the required injection amount reqFi of fuel is supplied to the engine 1 by the direct injector DI and the port injector PI.

The engine fuel injection controller of this embodiment has the advantages described below.

(1) When the possibility of engine stall is high when the engine 1 is idling, the electronic control unit 9 sets, as the direct injection amount FiD, a value obtained by adding the direct injection correction amount FiDad to the direct injection amount FiD, which is set within the range of the required injection amount reqFi. This increases the engine speed Ne in quick response to the increase in the fuel injection amount. This enables the target speed Net to be lowered while preventing engine stalling when the engine 1 is idling.

(2) After starting the correction of the direct injection amount FiD with the direct injection correction amount FiDad, the electronic control unit 9 gradually changes the direct injection correction amount FiDad from the initial correction amount $\alpha$ to zero. In this manner, the amount of fuel supplied to the engine 1 is gradually returned to the required injection amount reqFi. This prevents torque fluctuation of the engine 1 in an optimal manner.

It should be apparent to those skilled in the art that the present invention may be embodied in many other specific forms without departing from the spirit or scope of the invention. Particularly, it should be understood that the present invention may be embodied in the following forms.

In the preferred embodiment, the electronic control unit 9 performs the correction amount gradation processing shown in FIG. 7 separately from the direct injection amount correction processing. However, the electronic control unit 9 may perform the processing of steps T101 to T103 in place of the processing of step S605 in the direct injection amount correction processing.

In the preferred embodiment, the electronic control unit 9 determines, in the direct injection amount correction processing (specifically, in steps S601 and S602), whether or not the possibility of engine stalling is high based on the engine speed Ne and the speed variation $\Delta$Ne. However, the possibility may be determined by employing other parameters than those given in the preferred embodiment above.

In the preferred embodiment, a predetermined value is employed as the initial correction amount $\alpha$. However, the electronic control unit 9 may variably set the initial correction amount $\alpha$ based on the engine speed Ne.

In the preferred embodiment, the electronic control unit 9 selects the injector that is to be used for fuel injection based on the maps shown in FIGS. 2 and 3. However, the maps used for selecting an injector are not limited to the maps of the preferred embodiment. Any map may be used so far as it is set such that, when the engine 1 is idling, fuel is injected from both the direct injector DI and the port injector PI.

Figure 4:
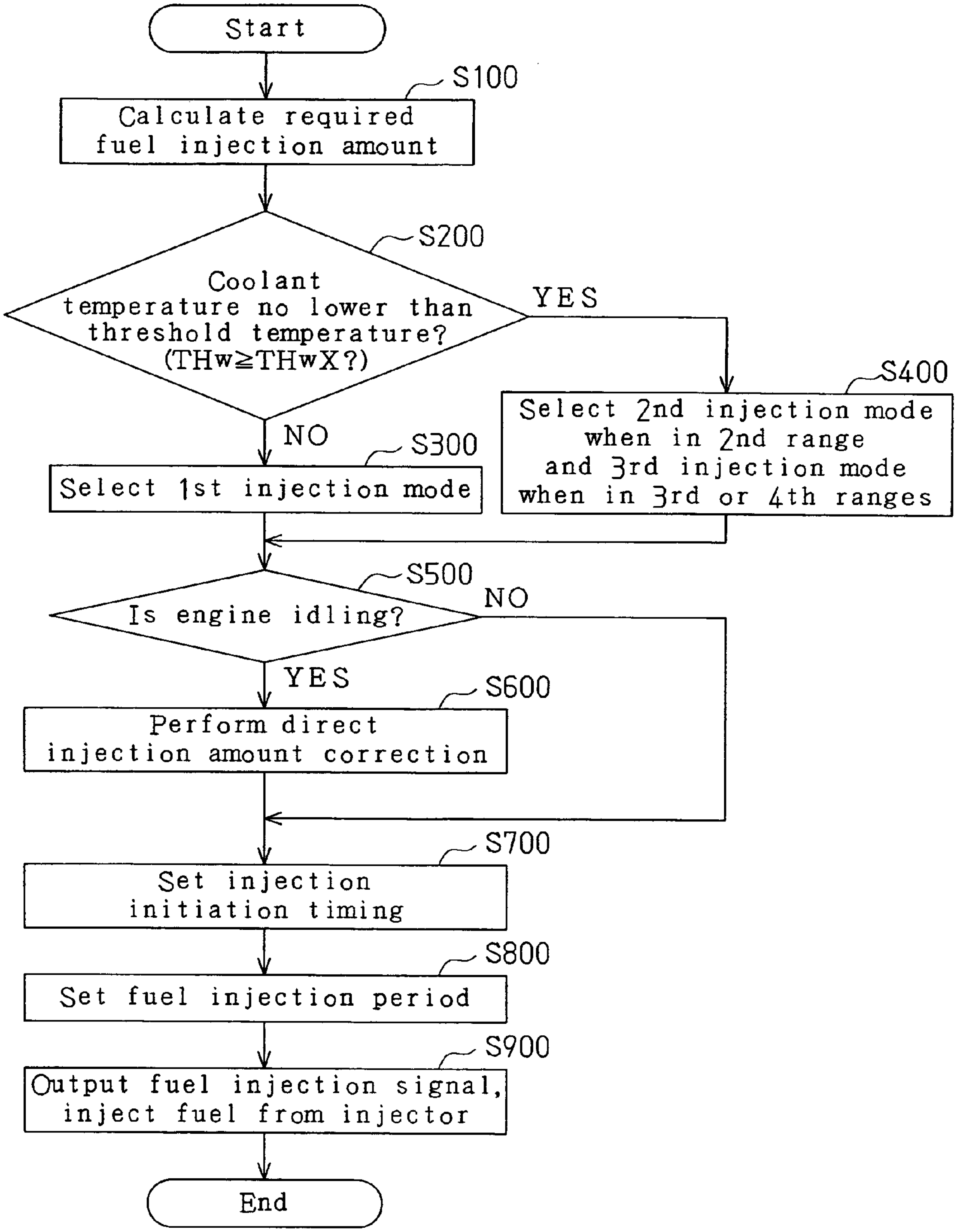
FIG. 4 is a flowchart showing the procedures performed during fuel injection processing in the preferred embodiment of the present invention.

In the preferred embodiment, the electronic control unit 9 performs the fuel injection processing as shown in FIG. 4. However, the procedures for the fuel injection processing are not limited as described in the preferred embodiment. The procedures for fuel injection processing may be modified as necessary so far as it includes a step for correcting the direct injection amount FiD through the direct injection amount correction processing when the engine 1 is idling.

Figure 5:
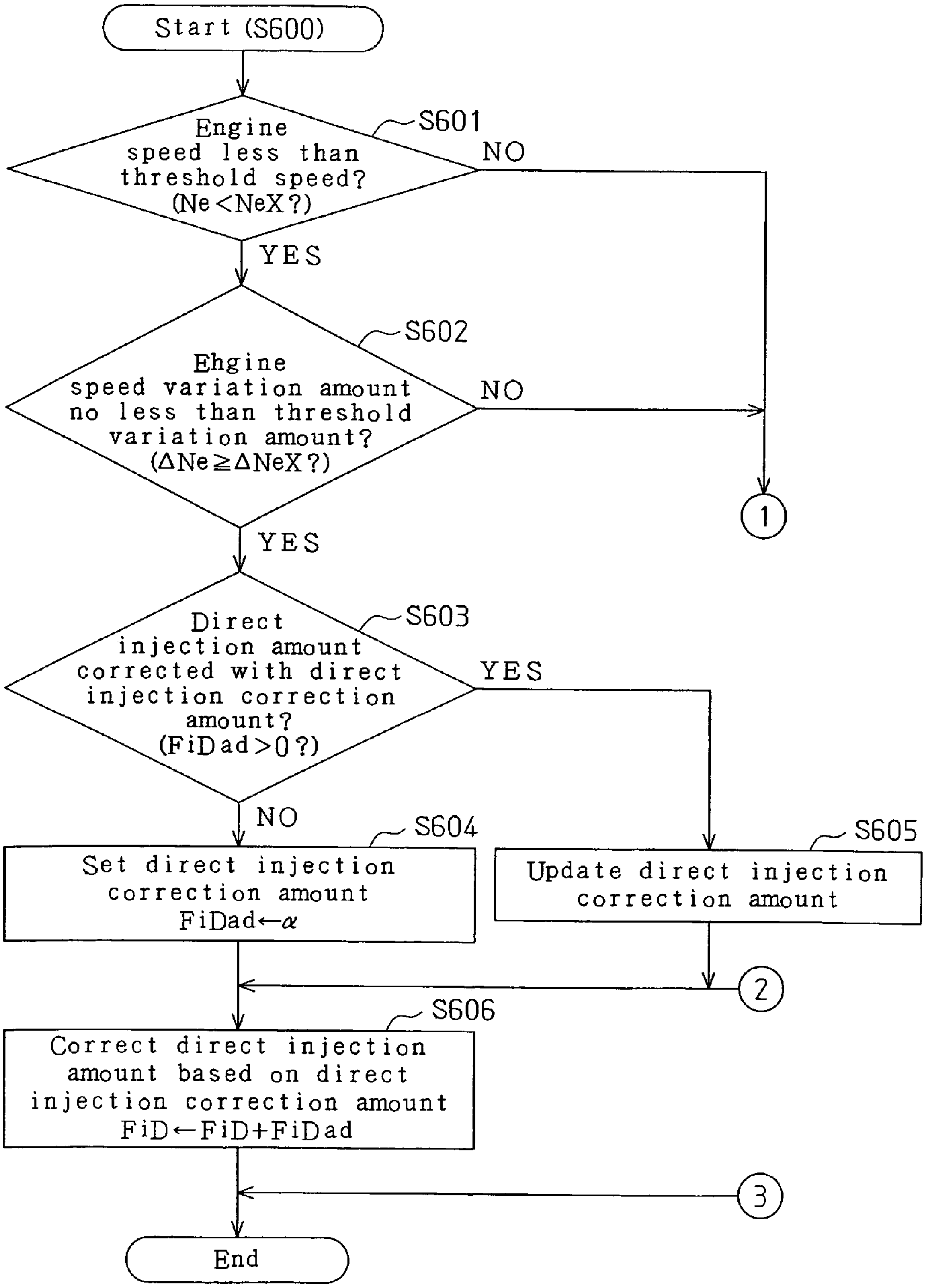
FIG. 5 is a flowchart showing part of the procedures performed during direct injection amount correction processing in the preferred embodiment of the present invention.

In the preferred embodiment, the electronic control unit 9 performs the direct injection amount correction processing as shown in FIGS. 5 and 6. However, the procedures for the direct injection amount correction processing are not limited as described in the preferred embodiment. The procedures for the fuel injection processing may be modified as necessary so far as it includes a step for increasing the direct injection amount FiD which is set within the range of the required injection amount reqFi when there is a possibility of engine stalling.

In the preferred embodiment, the port injector PI for injecting fuel into the intake port is employed as the intake injector. However, the injector is not necessarily required to inject fuel into the intake port, and any injector may be employed so far as it injects fuel into the intake passage 31.

In the preferred embodiment, the present invention is applied to the engine as shown in FIG. 1. However, the present invention may be applied to other types of engines. The present invention is applicable to any type of engine so far as it has a direct injector and an intake injector.

The present examples and embodiments are to be considered as illustrative and not restrictive, and the invention is not to be limited to the details given herein, but may be modified within the scope and equivalence of the appended claims.

What is claimed is:

1. A controller for an engine having a direct injector that injects fuel into a cylinder and an intake injector that injects fuel into an intake passage, in which the controller supplies the engine with fuel through the direct injector and the intake injector when the engine is idling, the controller comprising:

a control unit that determines whether there is a possibility of the engine stalling when the engine is idling and that selectively increases a fuel injection amount of the direct injector when the control unit determines that there is a possibility of the engine stalling.

2. The controller according to claim 1, wherein the control unit sets an increment value for the fuel injection amount of the direct injector based on speed of the engine.

3. The controller according to claim 2, wherein the control unit gradually changes the increment value after setting the increment value.

4. The controller according to claim 3, wherein the control unit gradually decreases the increment value after setting the increment value.

5. The controller according to claim 1, wherein the control unit determines that there is a possibility of engine stalling when the engine speed is lower than a first threshold value.

6. The controller according to claim 5, wherein the control unit determines that there is a possibility of engine stalling when the engine speed is lower than a first threshold value and variation of the engine speed is no less than a second threshold value.

7. A controller for an engine having a direct injector that injects fuel into a cylinder and an intake injector that injects fuel into an intake passage, and where the controller sets a direct injection amount, indicating fuel injection amount of the direct injector, and an intake injection amount, indicating fuel injection amount of the intake injector, and accordingly injects fuel from the direct injector and the intake injector when the engine is idling, the controller comprising:

a control unit that determines whether there is a possibility of the engine stalling when the engine is idling and, when the control unit determines that there is a possibility of the engine stalling, that calculates an increment value for the direct injection amount and adds the increment value to the direct injection amount to selectively set the fuel injection amount of the direct injector.

8. A method for controlling an engine having a direct injector, that injects fuel into a cylinder, and an intake injector, that injects fuel into an intake passage, the method comprising:

supplying the engine with fuel through the direct injector and the intake injector when the engine is idling;

determining whether the engine speed is lower than a first threshold value when the engine is idling;

determining whether variation of the engine speed is no less than a second threshold value when the engine is idling; and selectively increasing fuel injection amount of the direct injector when the engine speed is lower than the first threshold value and the variation of the engine speed is no less than the second threshold value.

9. The method according to claim 8, wherein said selectively increasing fuel injection amount of the direct injector includes:

setting an increment value for the fuel injection amount of the direct injector; and gradually changing the increment value.

* * * * *